(12) United States Patent
Allouche et al.

(10) Patent No.: US 12,494,846 B2
(45) Date of Patent: Dec. 9, 2025

(54) OPTOELECTRONIC ASSEMBLY

(71) Applicant: II-VI DELAWARE, INC., Wilmington, DE (US)

(72) Inventors: David Allouche, Wilmington, DE (US); Michael Chu, Wilmington, DE (US); Jonathan Ashbrook, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 18/450,879

(22) Filed: Aug. 16, 2023

(65) Prior Publication Data
US 2024/0313861 A1 Sep. 19, 2024

Related U.S. Application Data

(60) Provisional application No. 63/489,984, filed on Mar. 13, 2023.

(51) Int. Cl.
*H04B 10/40* (2013.01)

(52) U.S. Cl.
CPC .................................. *H04B 10/40* (2013.01)

(58) Field of Classification Search
CPC ........... H04B 10/40; H04B 10/24; G01J 1/44; G02B 6/12
See application file for complete search history.

(56) References Cited

U.S. PATENT DOCUMENTS

| | | | |
|---|---|---|---|
| 10,571,637 B2 | 2/2020 | Mizrahi et al. | |
| 11,002,926 B1 * | 5/2021 | Mathai | G02B 6/4284 |
| 2002/0185588 A1 * | 12/2002 | Wagner | H01S 5/02251 257/E31.095 |
| 2003/0035460 A1 | 2/2003 | Tsikos et al. | |
| 2003/0194168 A1 | 10/2003 | Ouchi | |
| 2003/0201462 A1 | 10/2003 | Pommer et al. | |

(Continued)

FOREIGN PATENT DOCUMENTS

| | | |
|---|---|---|
| EP | 3125008 A1 | 2/2017 |
| FR | 3146760 A1 | 9/2024 |

(Continued)

OTHER PUBLICATIONS

"International Search Report and Written Opinion mailed Mar. 24, 2020, in related PCT Application No. PCT/US2019/065105".

(Continued)

*Primary Examiner* — Georgia Y Epps
*Assistant Examiner* — Don J Williams
(74) *Attorney, Agent, or Firm* — Blank Rome LLP

(57) ABSTRACT

An optoelectronic assembly includes a printed circuit board (PCB), an integrated circuit (IC) substrate operably mounted on the PCB, the IC substrate comprising at least one of active elements and passive elements, a vertical-cavity surface-emitting laser (VCSEL) operably mounted on a first surface of the IC substrate, an optical detector operably mounted adjacent to the VCSEL on the first surface of the IC substrate, and a molding compound formed on the IC substrate encapsulating a plurality of sides of the VCSEL and a plurality of sides of the optical detector, in which at least one electrical communication path between the optical detector and the VCSEL is confined within the IC substrate.

34 Claims, 1 Drawing Sheet

(56) References Cited

U.S. PATENT DOCUMENTS

| | | | |
|---|---|---|---|
| 2010/0151614 | A1 | 6/2010 | Darbinyan et al. |
| 2012/0001166 | A1 | 1/2012 | Doany et al. |
| 2013/0315528 | A1 | 11/2013 | Levy |
| 2013/0334445 | A1 | 12/2013 | Tharumalingam et al. |
| 2015/0097778 | A1 | 4/2015 | Chang |
| 2015/0098677 | A1 | 4/2015 | Thacker et al. |
| 2015/0380897 | A1 | 12/2015 | Canumalla et al. |
| 2016/0105241 | A1 | 4/2016 | Keil |
| 2016/0226592 | A1* | 8/2016 | Arvelo .................. G02B 6/425 |
| 2017/0031115 | A1 | 2/2017 | Schaevitz et al. |
| 2018/0278011 | A1 | 9/2018 | Galvano et al. |
| 2018/0299628 | A1 | 10/2018 | Liu et al. |
| 2018/0335588 | A1 | 11/2018 | Jou et al. |
| 2020/0127156 | A1 | 4/2020 | Camarri et al. |
| 2020/0185581 | A1 | 6/2020 | Liu et al. |

FOREIGN PATENT DOCUMENTS

| | | | |
|---|---|---|---|
| JP | 2018088488 | A | 6/2018 |
| WO | 0206877 | A2 | 1/2002 |

OTHER PUBLICATIONS

"International Search Report and Written Opinion mailed Mar. 24, 2020, in related PCT Application No. PCT/US2019/065105".

"SWIR Cameras and Their Applications, (Optics),", Downloaded from https://axiomoptics.com/application/swir-imaging-applications/ on Mar. 2024.

Koifman, Vladimir, et al., "IEDM 2019: Sony SWIR Imager, Image Sensors World, 2019 (8 pages)".

Henderson, Robert K., et al., A 256x256 40nm/90nm CMOS 3D-Stacked 120dBDynamic-Range Reconfigurable Time-Resolved SPAD Imager, ISSCC 2019, Session 5, Image Sensors 5.7 (3 pages).

"Search Report issued in FR2310030 on Oct. 23, 2024".

Watts, Michael, et al., "Lidar on a Chip Puts Self-Driving Cars in the Fast Lane", 2023, pp. 1-17 (XP093215275) Extrait de l'Internet: URL:https://spectrum.ieee.org/mary-ellen-randall-2025-ieee-president-elect.

Kagawa, et al., "Development of face-to-face and face-to-back ultra-fine pitch Cu-Cu hybrid bonding. In: Proceedings:", IEEE 72nd Electronic Components and Technology Conference ECTC 2022, May 31-Jun. 3, 2022, San Diego, California, USA Piscataway, New Jersey, USA: IEEE, 2022, pp. 306-311. ISBN 978-1-6654-7943-1.

\* cited by examiner

OPTOELECTRONIC ASSEMBLY

CROSS-REFERENCE TO RELATED APPLICATIONS

The present application claims priority to U.S. Patent Application No. 63/489,984 filed Mar. 13, 2023. The aforementioned application is hereby incorporated by reference in its entirety.

FIELD

The embodiments disclosed herein are in the field of optic devices used in optical systems, and methods for manufacturing optical devices. More particularly, the embodiments disclosed herein relate to optical electronic assemblies used in optical devices, systems, and methods.

BACKGROUND

Unless otherwise indicated herein, the materials described herein are not prior art to the claims in the present application and are not admitted to be prior art by inclusion in this section.

Existing optical devices use optical electronic elements packages together to form optical electronic assemblies that are produced and operated in an inefficient manner. Currently, the production of optical devices implemented with optical electronic assemblies require separate mounting systems for the individual optical electronic elements. In some instances, each of the individual optical electronic elements are mounted on their own substrate, e.g., an integrated circuit (IC) substrate, and then the individual substrates require interfacing separate optical element substrates utilizing a separate joining substrate, e.g., a printed circuit board (PCB). However, the use of separate mounting substrates generates relatively large spacings (gaps) between the individual optical electronic elements and results in a large overall package profile, along both vertical and horizontal directions due to, for example, larger tolerances in PCB and accompanying trace manufacturing techniques. Accordingly, improvements over prior art optical devices using optical electronic elements packages together in optical electronic assemblies is desired.

The subject matter claimed herein is not limited to implementations that solve any disadvantages or that operate only in environments such as those described above. Rather, this background is only provided to illustrate one example technology area where some implementations described herein may be practiced.

These and other advantages of the present invention will become more fully apparent from the detailed description of the invention herein below.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Embodiments are directed to an optical transceiver device, a method of manufacturing an optical transceiver, and an optoelectronic assembly.

In one example, an optical transceiver device includes a printed circuit board (PCB), an integrated circuit (IC) substrate mounted on the PCB by a first plurality of electrical connections disposed between a first surface of the PCB and a first surface of the IC substrate, the IC substrate comprising at least one of active elements and passive elements, a vertical-cavity surface-emitting laser (VCSEL) mounted on a second surface of the IC substrate, opposite to the first surface of the IC substrate, with a second plurality of electrical connectors therebetween, and an optical detector mounted adjacent to the VCSEL on the second surface of the IC substrate with a third plurality of electrical connectors therebetween, in which the IC substrate includes a plurality of conductive pillars extending along a first direction between the first surface of the IC substrate and the second surface of the IC substrate and a plurality of interconnection layers extending along a second direction substantially normal to the first direction, and at least one electrical communication path between the optical detector and the VCSEL is confined within the IC substrate.

In another aspect of the disclosure, in the optical transceiver device, the at least one electrical communication path between the optical detector and the VCSEL confined within the IC substrate comprises a plurality of electrical communication paths between the optical detector and the VCSEL, each confined within the IC substrate.

In another aspect of the disclosure, in the optical transceiver device, the first plurality of electrical connections includes a plurality of controlled collapse chip connections (C4s).

In another aspect of the disclosure, in the optical transceiver device, the second plurality of electrical connectors include solder connections and the third plurality of electrical connectors include Cu—Cu hybrid bonding.

In another aspect of the disclosure, in the optical transceiver device, a first pitch between a first group of the plurality of conductive pillars underlying the optical detector is less than a second pitch between a second group of the plurality of conductive pillars underlying the VCSEL.

In another aspect of the disclosure, in the optical transceiver device, the plurality of conductive pillars comprise copper.

In another aspect of the disclosure, in the optical transceiver device, a width of the plurality of conductive pillars is within a range of about 40 μm to about 120 μm.

In another aspect of the disclosure, in the optical transceiver device, a pitch between the plurality of conductive pillars is within a range of about 30 to about 120 μm.

In another aspect of the disclosure, in the optical transceiver device, a thermally conductive compound is disposed between the VCSEL and the second surface of the IC substrate.

In another aspect of the disclosure, in the optical transceiver device, the optical detector is separated from the VCSEL by a gap have a width within a range of about 300 to about 500 μm.

In another aspect of the disclosure, in the optical transceiver device, a molding compound extends into the gap.

In another aspect of the disclosure, in the optical transceiver device, the molding compound formed on the second surface of the IC substrate covering a plurality of sides of the VCSEL and a plurality of sides of the optical detector.

In another aspect of the disclosure, in the optical transceiver device, a top surface of the molding compound is below a top surface of the VCSEL and a top surface of the optical detector.

In another aspect of the disclosure, in the optical transceiver device, the VCSEL is a backside emitting VCSEL.

In another aspect of the disclosure, in the optical transceiver device, the VCSEL comprises III-V materials.

In another aspect of the disclosure, in the optical transceiver device, the optical detector comprises InP materials.

In another aspect of the disclosure, in the optical transceiver device, a top of the VCSEL and a top of the optical detector are substantially co-planar.

In another aspect of the disclosure, in the optical transceiver device, a distance between a bottom surface of the VCSEL and the second surface of the IC substrate is within a range of about 50 μm to about 100 μm.

In another example, a method of manufacturing an optical transceiver includes mounting a vertical-cavity surface-emitting laser (VCSEL) on a first surface of an integrated circuit (IC) substrate using a first plurality of electrical connectors therebetween, the IC substrate comprising at least one of active elements and passive elements, mounting an optical detector adjacent to the VCSEL on the first surface of the IC substrate using a second plurality of electrical connectors therebetween, and covering a plurality of sides of the VCSEL and a plurality of sides of the optical detector with a molding compound.

In another aspect of the disclosure, the method of manufacturing an optical transceiver includes mounting the IC substrate on a printed circuit board (PCB) using a third plurality of electrical connections disposed between a first surface of the PCB and a second surface of the IC substrate, opposite to the first surface of the IC substrate.

In another aspect of the disclosure, in the method of manufacturing an optical transceiver, a top surface of the molding compound is below a top surface of the VCSEL and a top surface of the optical detector.

In another aspect of the disclosure, in the method of manufacturing an optical transceiver, the VCSEL is a backside emitting VCSEL.

In another aspect of the disclosure, in the method of manufacturing an optical transceiver, the VCSEL comprises III-V materials.

In another aspect of the disclosure, in the method of manufacturing an optical transceiver, the optical detector comprises InP materials.

In another aspect of the disclosure, in the method of manufacturing an optical transceiver, a top of the VCSEL and a top of the optical detector are substantially co-planar.

In another aspect of the disclosure, in the method of manufacturing an optical transceiver, a distance between a bottom surface of the VCSEL and the second surface of the IC substrate is within a range of about 50 μm to about 100 μm.

In another aspect of the disclosure, in the method of manufacturing an optical transceiver, the IC substrate includes a plurality of conductive pillars extending vertically from the first surface of the IC substrate to a second surface of the IC substrate, opposite to the first surface of the IC substrate, and a plurality of conductive layers extending horizontally.

In another aspect of the disclosure, in the method of manufacturing an optical transceiver, at least one electrical communication path between the optical detector and the VCSEL is confined within the IC substrate.

In another aspect of the disclosure, the method of manufacturing an optical transceiver includes forming, before the mounting of the optical detector, a thermally conductive compound between the VCSEL and the first surface of the IC substrate.

In another example, an optoelectronic assembly includes a printed circuit board (PCB), an integrated circuit (IC) substrate operably mounted on the PCB, the IC substrate comprising at least one of active elements and passive elements, a vertical-cavity surface-emitting laser (VCSEL) operably mounted on a first surface of the IC substrate, an optical detector operably mounted adjacent to the VCSEL on the first surface of the IC substrate, and a molding compound formed on the IC substrate encapsulating a plurality of sides of the VCSEL and a plurality of sides of the optical detector, in which at least one electrical communication path between the optical detector and the VCSEL is confined within the IC substrate.

In another aspect of the disclosure, in the optoelectronic assembly, the IC substrate includes a plurality of conductive pillars extending along a first direction between the first surface of the IC substrate and a second surface of the IC substrate, and a plurality of interconnection layers extending along a second direction substantially normal to the first direction.

In another aspect of the disclosure, in the optoelectronic assembly, the at least one electrical communication path between the optical detector and the VCSEL confined within the IC substrate is effectuated by the plurality of conductive pillars and the plurality of interconnection layers.

In another aspect of the disclosure, in the optoelectronic assembly, a first pitch between a first group of the plurality of conductive pillars underlying the optical detector is less than a second pitch between a second group of the plurality of conductive pillars underlying the VCSEL.

In another aspect of the disclosure, in the optoelectronic assembly, a top of the VCSEL and a top of the optical detector are substantially co-planar.

In another aspect of the disclosure, in the optoelectronic assembly, a first distance between a bottom surface of the VCSEL and the first surface of the IC substrate is within a range of about 50 μm to about 100 μm.

In another aspect of the disclosure, in the optoelectronic assembly, the IC substrate is operably mounted on the PCB by a first plurality of electrical connections disposed between a first surface of the PCB and a second surface of the IC substrate, opposite to the first surface of the IC substrate.

In another aspect of the disclosure, in the optoelectronic assembly, the first plurality of electrical connections includes a plurality of controlled collapse chip connections (C4s).

In another aspect of the disclosure, in the optoelectronic assembly, the VCSEL is operably mounted on the first surface of the IC substrate by a second plurality of electrical connectors therebetween, in which the optical detector is operably mounted adjacent to the VCSEL on a second surface of the IC substrate, opposite to the first surface of the IC substrate, by a third plurality of electrical connectors therebetween.

In another aspect of the disclosure, in the optoelectronic assembly, the second plurality of electrical connectors include solder connections and the third plurality of electrical connectors include Cu—Cu hybrid bonding.

In another aspect of the disclosure, in the optoelectronic assembly, the optical detector is separated from the VCSEL by a gap have a width within a range of −300 μm to −500 μm.

In another aspect of the disclosure, in the optoelectronic assembly, the molding compound extends into the gap.

In another aspect of the disclosure, in the optoelectronic assembly, a top surface of the molding compound is below a top surface of the VCSEL and a top surface of the optical detector.

In another aspect of the disclosure, in the optoelectronic assembly, the VCSEL is a backside emitting VCSEL.

In another aspect of the disclosure, in the optoelectronic assembly, the VCSEL comprises III-V materials.

In another aspect of the disclosure, in the optoelectronic assembly, the optical detector comprises InP materials.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1A:
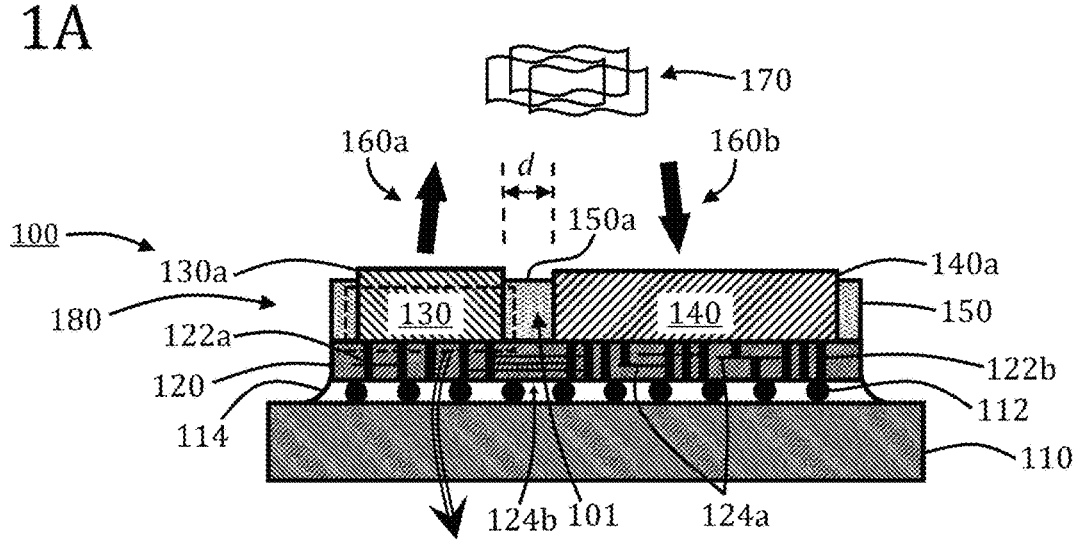
FIG. 1A is a cross-sectional diagram illustrating an exemplary optoelectronic device including a transceiver.

It is to be understood that the figures and descriptions of the present invention may have been simplified to illustrate elements that are relevant for a clear understanding of the present embodiments, while eliminating, for purposes of clarity, other elements found in an optical device, system using an optical device, and method for manufacturing an optical device. Those of ordinary skill in the art will recognize that other elements may be desirable and/or required in order to implement the present embodiments. However, because such elements are well known in the art, and because they do not facilitate a better understanding of the present embodiments, a discussion of such elements is not provided herein. It is also to be understood that the drawings included herewith only provide diagrammatic representations of the presently preferred structures of the present invention and that structures falling within the scope of the present embodiments may include structures different than those shown in the drawings. Reference will now be made to the drawings wherein like structures are provided with like reference designations.

As noted previously, in existing optical devices using separate transmit and receive communication pathways, two integrated circuits (ICs) are implemented—one IC is implemented for light generation and another IC is implemented for light detection. In general, atypical system-level "signal pathway" sequentially may include a transmission IC, a light generator device, an optical sensor, and a receiver IC. However, many applications require synchronization between the transmission IC and the receive IC to allow for precise timing and communication.

Accordingly, the system-level performance is degraded by the latency and synchronization between the receiver IC and the transmission IC. In a conventional solution, this signal pathway involves implementing one or more PCB-level traces, which wastes both processing time and increases power consumption. Accordingly, improvements over prior art optical devices having tighter synchronization between the receiver and transmission circuits is desired, which results in reduced latency and improved system-level performance.

As noted previously, existing methods for producing solid optical lenses comprising solid optical materials. In general, optical lens production is limited by the materials and processes used to manufacture solid optical lenses, in which the scale of production cannot be increased in a cost effective manner.

Unless specific arrangements described herein are mutually exclusive with one another, the various implementations described herein can be combined in whole or in part to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

FIG. 1A is a cross-sectional diagram illustrating an exemplary optoelectronic device. In FIG. 1, the optoelectronic device 100 includes a printed circuit board (PCB) 110, an integrated circuit (IC) substrate 120, a light generating device 130, and a light detector device 140, in which the light generating device 130 and that light detector device 140 are encapsulating within an optional molding compound 150. The optoelectronic device 100 may be considered to be a monolithic transceiver that processes both driver operations of the light generating device 130 and receiving operations of the light detector device 140.

In FIG. 1A, light 160a generated by the light generating device 130 is emitted from a top surface of the light generating device 130 and reflected by element(s) 170. Then, the reflected light 160b is received by the light detector device 140. Based upon various operational parameters associated with the transmitted light 160a and the received reflected light 160b, particular aspects of the element(s) 170 may be characterized. In some implementations, the optoelectronic device 100 can be used in a Light Detection and Ranging (LiDAR) configuration as a remote scanning and sensing method that uses pulses of the transmitted and reflected lights 160a and 160b to measure ranges (variable distances), as well as create realistic, accurate, and fast 3D representations of close-range objects and environments.

In FIG. 1A, the light generating device 130 may include one (or more) of various different laser devices configured to produce specific types of light having particular characteristics. For example, the light generating device 130 may include a vertical-cavity surface-emitting laser (VCSEL) having a backside or frontside emitting configuration. Alternatively, for example, the light generating device 130 may include a side-emitting laser. It is desirable that the light generating device 130 have extremely short rise times in order to enable fast pulse sequences in the low nanosecond range and below.

In FIG. 1A, the light detector device 140 may include one (or more) of various different light detectors configured to receive specific types of light having particular characteristics in order to produce electrical signals that correspond to the received light. For example, the light detector device 140 may include one of a charge-coupled device (CCD) and an active-pixel sensor, such as a complementary metal-oxide-semiconductor (CMOS) image sensor.

In some implementations, the light detector device 140 may be made from combinations of group III-V materials, such as InP, or may be a SiGe detector device. Additionally, the light detector device 140 may include single-photon avalanche diode (SPAD).

In some implementations, the light generating device 130 and the light detector device 140 may be made from the same or different materials. For example, one or both of the light generating device 130 and the light detector device 140 may be made from Si-based materials and/or InP-based materials.

The PCB 110 board is electrically and mechanically connected to the IC substrate 120 via a chip connection system and an underfill provided between opposing (first) surfaces of the PCB 110 and the IC substrate 120. The IC substrate 120 is typically composed of silicon and can include a CMOS IC with one or more active or passive components, for example, diodes, transistors, capacitors, resistors, microcontrollers, power circuits, eye safety circuits, etc., such that the IC substrate 120 may be referred to as an "Active," "Passive," or combination IC substrate 120. Also, in the IC substrate (CMOS IC), Through Silicon Vias (TSVs) are present, which allow electrical connections between the top and bottom of the IC. The use of TSVs minimize the electrical and thermal path length from the PCB to the CMOS device and to the VCSEL and/or Detector. The PCB 110 can be plastic, fiberglass, or resin composite with metal traces that allow interconnection between the optoelectronic device 100 and other components and electrical connections on the PCB 110 like external microcontrollers, power supplies, clock signals, external triggers, interfaces, etc. In some implementations, the chip connection system may include a controlled collapse chip connection (C4) or a chip connection (C2). For example, solder balls 112 and a bonding (underfill) layer 114 may be used to provide both the electrical and/or mechanical connections between the PCB 110 and the IC substrate 120.

In FIG. 1A, the IC substrate 120 includes a plurality of conductive pathways 122a and 122b between opposing surfaces (first and second surfaces) of the IC substrate 120, generally referred to as TSVs. In some implementations, the plurality of conductive pathways 122a and 122b may have end regions exposed at the opposing first and second surfaces of the IC substrate 120, and may comprises conductive pathways that do not extend to either of the opposing first and second surfaces of the IC substrate 120. In particular, some of the conductive pathways 122a and 122b may be implemented to electrically interconnect redistribution layers (interconnection layers) within the IC substrate 120 without being exposed at the opposing first and second surfaces of the IC substrate 120, or may have end regions exposed at only one of the opposing first and second surfaces of the IC substrate 120.

Figure 1B:
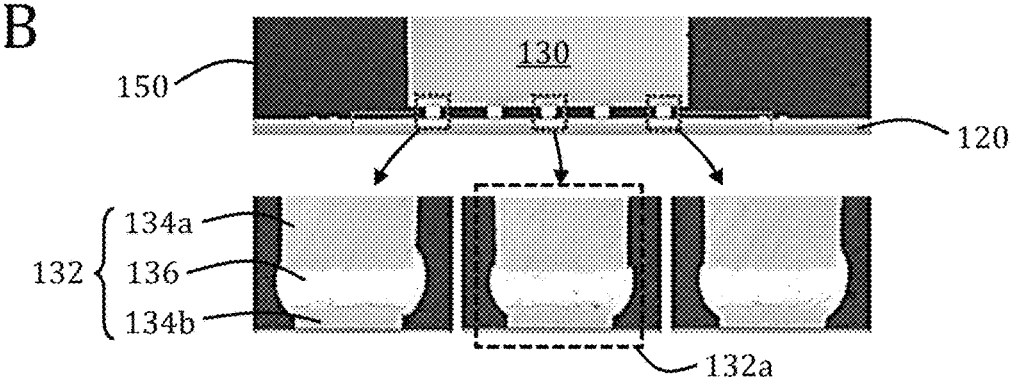
FIG. 1B is an enlarged view of the exemplary optoelectronic device including the transceiver.

In some implementations, conductive pillars 132 may be disposed between the light generating device 130 and the IC substrate 120. The conductive pillars 132 may comprise a metal or metal alloy, such as copper, and may be distributed as an array on the IC substrate 120, as well as on the light generating device 130 and/or the light detector device 140. Each of the conductive pillars 132 may include an electrically conductive pillar 134a and a copper bump 134b electrically and mechanically connected by an intermediate connection 136, such as solder. FIG. 1B is representative of the conductive pillars 132 for both the light generating device 130 and the light detector device 140. Although FIG. 1B may depict that the electrically conductive pillars 134a have a diameter greater than a diameter of the copper bumps 134b, both the electrically conductive pillars 134a and the copper bumps 134b may have substantially the same or different diameters. By implementing the use of electrically conductive pillars 134a and the copper bumps 134b to make the electrical connections between the light generating device 130 and the IC substrate 120, reduced resistance and parasitics allowing for faster rise and fall time of the electrical and optical pulses.

In some implementations, the conductive pillars 132 may be distributed in a first array between the IC substrate 120 and the light generating device 130 and in a second array between the IC substrate 120 and the light detector device 140. For example, the conductive pillars 132 distributed in the first array and the second array may have a pitch within a range of 30 μm to 120 μm. In some implementations, the pitch between conductive pillars 132 in the first array may be different than the pitch between conductive pillars 132 in the second array based, in part, upon a required number of electrical connections to (between) the light generating device 130 and the light detector device 140, as well as electrical connections necessary to the PCB 110. For example, the pitch between the conductive pillars 132 in the second array underlying the light detector device 140 may be within a range of 1 µm to 5 µm, and the pitch between the conductive pillars 132 in the first array underlying the light generating device 130 may be within a range of 70 µm to 100 µm. In particular, since the light detector device 140 may include a substantially large array of light detecting elements, a greater number of the conductive pillars 132 underlying the light detector device 140 may be required compared to a number of the conductive pillars 132 necessary for the light generating device 130. Accordingly, the pitch between the conductive pillars 132 underlying the light detector device 140 may be less and the pitch between the conductive pillars 132 underlying the light generating device 130. In some implementations, the pitch between the conductive pillars 132 underlying the light detector device 140 may be within a range of 1 µm to 5 µm and another type of electrical interconnection technology may need to be used, for example, Cu to Cu Hybrid Bonding or equivalent to allow for tight pitch considerations.

Additionally, the IC substrate 120 may include a plurality of conductive interconnection layers and redistribution layers 124a and 124b formed within the IC substrate 120, as well along the first and second opposing surfaces of the IC substrate 120. Generally, interconnection layers are those metallization layers within the IC substrate and are formed as part of the IC substrate manufacturing process, e.g. through a CMOS process, while redistribution layers are metal routing added after the main fabrication process of the IC substrate to simplify connections made external to the IC substrate 120. However, for purposes of simplicity of this disclosure, both interconnection layers and redistribution layers will be referred to generally as redistribution layers 124a and 124b and their respective locations and interconnections, e.g., within the IC substrate 120 or on a surface of the IC substrate would provide sufficient insight to a person or ordinary skill, given the remainder of this disclosure, on their manufacture and use. The plurality of conductive redistribution layers 124a and 124b extend along a direction substantially normal to a direction in which the conductive pathways 122a and 122b extend. Here, the solder balls 112 would be electrically and mechanically connected to the conductive redistribution layers 124a and 124b formed on the first surface of the IC substrate 120. Here, for example, the conductive redistribution layer 124a includes a metal interconnect of the IC substrate 120, and the conductive redistribution layer 124b includes a metal routing added to the IC substrate 120 during later processing in order to simplify connection to other components.

The conductive redistribution layers 124a and 124b are configured to provide electrical communication pathways between the light generating device 130 and the light detector device 140 and any active or passive elements embedded in the silicon IC substrate 120, such as those identified above, as well as provide electrical communication pathways between the light generating device 130, the light detector device 140, and the PCB 110. In some implementations, the conductive redistribution layers 124b may include conductive layers that provide exclusive electrical communication pathways between one or more of the light generating device 130, the light detector device 140, as well as active and passive elements embedded in the IC substrate 120. For example, the exclusive electrical communication pathways may provide for confined electrical communication between the light generating device 130, the light detector device 140, and the embedded active and passive elements within the IC substrate 120, without the need to include the PCB 110 to assist in passing electrical signals exclusively between the light generating device 130 and the light detector device 140. Additionally, some of the conductive redistribution layers 124b may provide direct communication pathways between the light generating device 130 and the light detector device 140, while others of the conductive redistribution layers 124b, such as those on the bottom surface of the IC substrate 120, may provide communication between the embedded active and passive elements within the IC substrate 120 to an exterior of the IC substrate 120, e.g, through the PCB 110.

Power and ground signals may be provided directly to the light generating device 130 and the light detector device 140 by one or more of the conductive redistribution layers 124b. The conductive redistribution layers 124b may provide indirect communication pathways between the light generating device 130 and the light detector device 140 by electrical connections with ones of the conductive pathways 122a and 122b that are either embedded within the IC substrate 120 (and do not extend to the opposing surfaces of the IC substrate) or with ones of the conductive pathways 122a and 122b that extend between the opposing surfaces of the IC substrate 120. In some implementations, the conductive redistribution layers 124b along with the conductive pathways 122a and 122b provide for the direct communication between the light generating device 130, the light detector device 140, and any other active or passive elements in the IC substrate 120 to provide a shortest communication pathway possible. Accordingly, parasitic noise may be reduced by not having to using the PCB 110 to communicate between the light generating device 130 and the light detector device 140, and lower impedance/parasitics provide for faster rise and fall times of electrical and optical pulses. Additionally, an area occupied by the light generating device 130 and the light detector device 140 (footprint) is reduced, i.e., no need for room on the PCB 110 to connect the light generating device 130 and the light detector device 140. Moreover, the bill of materials for an end user is reduced compared to conventional configurations, which allows for faster communication between the light generating device 130 and the light detector device 140.

In FIG. 1A, the light generating device 130 and the light detector device 140 are mounted onto the second surface of the IC substrate 120 with a plurality of electrical connections 132. In some implementations, a distance between a bottom surface of the light generating device 130 and the opposing (second) surface of the IC substrate is within a range of 50 to 100 µm. Accordingly, compared to conventional distances, this reduced distance provides for lower resistance and lower parasitics.

In some implementations, the light generating device 130 is mounted onto the second surface of the IC substrate 120 before the light detector device 140 is mounted onto the second surface of the IC substrate 120. For example, the light generating device 130 is mounted onto the second surface of the IC substrate 120 and the electrical connections 132 may be formed using solder reflow process. Then, the light detector device 140 may be mounted onto the second surface of the IC substrate 120 using a pick-and-place process implementing a direct bonding or fusion bonding process. For example, the light detector device 140 may be mounted onto the second surface of the IC substrate 120 using a Cu—Cu hybrid bonding process, in which the light generating device 130 mounted onto the second surface of the IC substrate 120 is not degraded. U.S. Pat. No. 11,189,985 is incorporated by reference in its entirety for describing hybrid bonding. In particular, the process(es) used to mount the light detector device 140 onto the second surface of the IC substrate 120 would not include temperature ranges that could possibly damage the electrical connections previously made between electrical interconnections between the light generating device 130 and the IC substrate 120.

By using separate steps for mounting the light generating device 130 and the light detector device 140 onto the second surface of the IC substrate 120, a spacing gap 101 formed between the light generating device 130 and the light detector device 140 can be minimized. The spacing gap 101 may have a gap distance d within a range of −300 µm to −500 µm. Conventionally, separate substrates and or packages are used for mounting each of light generating and detecting devices onto a PCB. However, by mounting both the light generating device 130 and the light detector device 140 onto a single substrate, such as upon the second surface of the IC substrate 120, the gap distance d can be reduced substantially, thereby improving the optical characteristics of the optical transceiver solution for certain types of 3D sensing applications, along with minimizing noise and/or reducing I2R losses because the light generating device 130 and the light detector device 140 are orders of magnitude closer.

In FIG. 1A, the molding compound 150 is formed on the second surface of the IC substrate and covers, partially covers, or substantially covers sides 130a of the light generating device 130 and sides 140a of the light detector device 140. Additionally, a portion 150a of the molding compound 150 is formed between the light generating device 130 and the light detector device 140 within the spacing gap 101. Accordingly, mechanical rigidity between the light generating device 130 and the light detector device 140 may be increased and mechanical stability of the optoelectronic device 100 may be improved. This has the added benefit of fixing the relative locations of the light generating device 130 and the light detector device 140 at the time of manufacturing the optical sub-assembly 180, which can allow for more precise, repeatable, and stable alignment of the light generating device 130 and the light detector device 140.

Additionally, as shown in FIG. 1A, the molding compound 150 may be disposed between a bottom surface of the light generating device 130 and the second surface of the IC substrate 120. Accordingly, this may further provide for mechanical stability between the light generating device 130 and the light detector device 140, as well as between the light generating device 130 and the IC substrate 120, and further improves stability of the optoelectronic device 100.

In some implementations, the light generating device 130 may produce thermal energy in the form of heat during operation. For example, the light generating device 130 may be formed from combinations of III-V materials, which have a higher coefficient of thermal expansion (CTE) than the IC substrate 120. Accordingly, a thermal management system may be implemented to prevent damage caused by the heat generated during operation of the light generating device 130.

Additionally, a thermal management system may be implemented to ensure proper operation of the light generating device 130, such as preventing wavelength and optical power shifts due to temperature increases. In some implementations, a high thermally conductive material may be provided between the light generating device 130 and the IC substrate 120. For example, once the electrical connections 132 have been made between the light generating device 130 and the IC substrate 120, and prior to placement of the light detector device 140 and before the molding compound is formed, the high thermally conductive material may be provided between the light generating device 130 and the second surface of the IC substrate 120 and to extend between the electrically conductive pillars 134 of the light generating device 130 and the electrically conductive pillars 122 of the IC substrate 120. Accordingly, the heat generated during operation of the light generating device 130 can be transmitted through the IC substrate 120, as well as the molding compound 150.

In FIG. 1A, a top surface of the molding compound 150 is depicted to be below top surfaces of the light generating device 130 and the light detector device 140. Although not shown, a protection layer may be provided overlying the top surfaces of the light generating device 130 and the light detector device 140, such as a SiN layer. Additionally, optical elements, e.g., diffusion filter, and/or focusing elements, may be provided over the top of the light generating device 130, as well as over the top of the light detector device 140.

In FIG. 1A, the top surfaces of the light generating device 130 and the light detector device 140 may be depicted as being substantially co-planar. Certain embodiments may benefits from the top surfaces being substantially co-planar. However, the top surfaces of the light generating device 130 and the light detector device 140 may not be substantially co-planar and may be mutually offset.

As a result of the configurations depicted in FIGS. 1A and 1B, tighter synchronization between the light generation device 130 and light detector device 140 is achieved. In particular, by providing a configuration in which communication between the light generation device 130 and light detector device 140 is implemented without using the PCB 110, or reduced reliance thereon for electrical connections, latency is reduced and system-level performance is improved.

The overall structure of the optoelectronic assembly/device depicted in FIGS. 1A and 1B allows for tighter synchronization between the light generating device 130 and optical detector device 140 since the signal pathways are shortened between the light generating device 130 and optical detector device 140, versus a conventional system with a discrete light generation chip and a discrete light receiver chip mounted on a PCB. The overall structure also allows for a much smaller distance between the light generating device 130 and optical detector device 140 than a conventional system with the light source and light detector packaged separately. In FIGS. 1A and 1B, the minimum distance is limited by chip-scale process design rules (on the order of a few hundred microns) rather than PCB design rules (on the order of a few millimeters) The overall structure has systemic advantages related to both improved optical and electrical operational characteristics in relation to a separation distance between the light generating device 130 and optical detector device 140.

Unless specific arrangements described herein are mutually exclusive with one another, the various implementations described herein can be combined in whole or in part to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transceiver device, comprising:
   a printed circuit board (PCB);
   an integrated circuit (IC) substrate mounted on the PCB by a first plurality of electrical connections disposed between a first surface of the PCB and a first surface of the IC substrate, the IC substrate comprising active elements embedded in the IC substrate;
   a vertical-cavity surface-emitting laser (VCSEL) mounted on a second surface of the IC substrate, opposite to the first surface of the IC substrate, with a second plurality of electrical connectors therebetween; and
   an optical detector mounted adjacent to the VCSEL on the second surface of the IC substrate with a third plurality of electrical connectors therebetween;
   wherein the IC substrate includes a plurality of conductive pillars extending along a first direction between the first surface of the IC substrate and the second surface of the IC substrate and a plurality of interconnection layers extending along a second direction substantially normal to the first direction, and
   wherein at least one active element embedded in the IC substrate provides driver operations of the VCSEL and at least one electrical communication path between an active or passive element embedded in the IC substrate and at least one of the optical detector and the VCSEL is confined within the IC substrate.

2. The optical transceiver device of claim 1, wherein the at least one electrical communication path between the optical detector and the VCSEL confined within the IC substrate comprises a plurality of electrical communication paths between the optical detector and the VCSEL, each confined within the IC substrate.

3. The optical transceiver device of claim 1, wherein the first plurality of electrical connections includes a plurality of controlled collapse chip connections (C4s).

4. The optical transceiver device of claim 1, wherein the second plurality of electrical connectors include solder connections and the third plurality of electrical connectors include Cu—Cu hybrid bonding.

5. The optical transceiver device of claim 1, wherein a first pitch between a first group of the plurality of conductive pillars underlying the optical detector is less than a second pitch between a second group of the plurality of conductive pillars underlying the VCSEL.

6. The optical transceiver device of claim 1, the plurality of conductive pillars comprise copper.

7. The optical transceiver device of claim 1, wherein a width of the plurality of conductive pillars is within a range of about 40 μm to about 120 μm.

8. The optical transceiver device of claim 7, wherein a pitch between the plurality of conductive pillars is within a range of about 30 to about 120 μm.

9. The optical transceiver device of claim 1, further comprising a thermally conductive compound disposed between the VCSEL and the second surface of the IC substrate.

10. The optical transceiver device of claim 1, wherein the optical detector is separated from the VCSEL by a gap have a width within a range of about 300 to about 500 μm.

11. The optical transceiver device of claim 10, further comprising a molding compound that extends into the gap.

12. The optical transceiver device of claim 11, wherein the molding compound formed on the second surface of the IC substrate covering a plurality of sides of the VCSEL and a plurality of sides of the optical detector.

13. The optical transceiver device of claim 12, wherein a top surface of the molding compound is below a top surface of the VCSEL and a top surface of the optical detector.

14. The optical transceiver device of claim 1, wherein the VCSEL is a backside emitting VCSEL.

15. The optical transceiver device of claim 1, wherein the VCSEL comprises III-V materials.

16. The optical transceiver device of claim 1, wherein the optical detector comprises InP materials.

17. The optical transceiver device of claim 1, wherein a top of the VCSEL and a top of the optical detector are substantially co-planar.

18. The optical transceiver device of claim 1, wherein a distance between a bottom surface of the VCSEL and the second surface of the IC substrate is within a range of about 50 μm to about 100 μm.

19. An optoelectronic assembly, comprising:
   a printed circuit board (PCB);
   an integrated circuit (IC) substrate operably mounted on the PCB, the IC substrate comprising active elements embedded in the IC substrate;
   a vertical-cavity surface-emitting laser (VCSEL) operably mounted on a first surface of the IC substrate;
   an optical detector operably mounted adjacent to the VCSEL on the first surface of the IC substrate; and
   a molding compound formed on the IC substrate encapsulating a plurality of sides of the VCSEL and a plurality of sides of the optical detector,
   wherein at least one active element embedded in the IC substrate provides driver operations of the VCSEL and at least one electrical communication path between an active or passive element embedded in the IC substrate and at least one of the optical detector and the VCSEL is confined within the IC substrate.

20. The optoelectronic assembly of claim 19, wherein the IC substrate comprises:
   a plurality of conductive pillars extending along a first direction between the first surface of the IC substrate and a second surface of the IC substrate, and
   a plurality of interconnection layers extending along a second direction substantially normal to the first direction.

21. The optoelectronic assembly of claim 20, wherein the at least one electrical communication path between the optical detector and the VCSEL confined within the IC substrate is effectuated by the plurality of conductive pillars and the plurality of interconnection layers.

22. The optoelectronic assembly of claim 20, wherein a first pitch between a first group of the plurality of conductive pillars underlying the optical detector is less than a second pitch between a second group of the plurality of conductive pillars underlying the VCSEL.

23. The optoelectronic assembly of claim 19, wherein a top of the VCSEL and a top of the optical detector are substantially co-planar.

24. The optoelectronic assembly of claim 19, wherein a first distance between a bottom surface of the VCSEL and the first surface of the IC substrate is within a range of about 50 µm to about 100 µm.

25. The optoelectronic assembly of claim 19, wherein the IC substrate is operably mounted on the PCB by a first plurality of electrical connections disposed between a first surface of the PCB and a second surface of the IC substrate, opposite to the first surface of the IC substrate.

26. The optoelectronic assembly of claim 25, wherein the first plurality of electrical connections includes a plurality of controlled collapse chip connections (C4s).

27. The optoelectronic assembly of claim 19,
   wherein the VCSEL is operably mounted on the first surface of the IC substrate by a second plurality of electrical connectors therebetween, and
   wherein the optical detector is operably mounted adjacent to the VCSEL on a second surface of the IC substrate, opposite to the first surface of the IC substrate, by a third plurality of electrical connectors therebetween.

28. The optoelectronic assembly of claim 27, wherein the second plurality of electrical connectors include solder connections and the third plurality of electrical connectors include Cu—Cu hybrid bonding.

29. The optoelectronic assembly of claim 19, wherein the optical detector is separated from the VCSEL by a gap have a width within a range of ~300 µm to ~500 µm.

30. The optoelectronic assembly of claim 29, wherein the molding compound extends into the gap.

31. The optoelectronic assembly of claim 19, wherein a top surface of the molding compound is below a top surface of the VCSEL and a top surface of the optical detector.

32. The optoelectronic assembly of claim 19, wherein the VCSEL is a backside emitting VCSEL.

33. The optoelectronic assembly of claim 19, wherein the VCSEL comprises III-V materials.

34. The optoelectronic assembly of claim 19, wherein the optical detector comprises InP materials.

* * * * *